(12) United States Patent  (10) Patent No.: US 6,588,325 B1
Savage  (45) Date of Patent: Jul. 8, 2003

(54) DEEP FAT FRYER LIFTING ASSEMBLY

(75) Inventor: Steven J. Savage, Concord, NH (US)

(73) Assignee: Pitco Frialator, Inc., Concord, NH (US)

( * ) Notice: Subject to any disclaimer, the term of this patent is extended or adjusted under 35 U.S.C. 154(b) by 0 days.

(21) Appl. No.: 10/284,297

(22) Filed: Oct. 31, 2002

(51) Int. Cl.[7] .............................................. A47J 37/12
(52) U.S. Cl. .............................. 99/407; 99/336; 99/403
(58) Field of Search ................... 99/326–336, 403–417, 99/443 R, 443 C, 386; 126/373.1, 391.1, 369; 210/167, DIG. 8

(56) References Cited

U.S. PATENT DOCUMENTS

| | | | | |
|---|---|---|---|---|
| 1,506,113 A | * | 8/1924 | Dearing ........................ 99/336 |
| 1,551,869 A | * | 9/1925 | Dearing ........................ 99/336 |
| 3,187,664 A | * | 6/1965 | Jennings .................... 99/407 X |
| 3,501,316 A | * | 3/1970 | Guthrie, Sr. ................. 99/336 |
| 3,563,158 A | * | 2/1971 | Omer ........................ 99/330 X |
| 3,690,246 A | * | 9/1972 | Guthrie, Sr. ............... 99/410 X |
| 3,821,925 A | * | 7/1974 | Moore ....................... 99/407 X |
| 4,287,818 A | * | 9/1981 | Moore et al. ............. 99/416 X |
| 4,325,491 A | * | 4/1982 | Barnhill .................. 220/314 X |
| 4,721,094 A | * | 1/1988 | Nett ............................ 126/369 |
| 4,930,408 A | * | 6/1990 | King et al. ................... 99/407 |
| 4,997,101 A | * | 3/1991 | King et al. ................. 220/318 |
| 5,402,712 A | * | 4/1995 | King et al. ................... 99/407 |
| 6,009,795 A | | 1/2000 | Werts |
| 6,322,831 B1 | | 11/2001 | Mote et al. |

* cited by examiner

Primary Examiner—Timothy F. Simone (57) ABSTRACT

A mechanical assist for raising and lowering food in baskets or trays in a deep fat fryer is described. The mechanical assist in lifting the food to be cooked is provided by opposed springs and cam members on a main axle whereby when an operator raises and lowers a handle, the rotational movement of the handle is translated into vertical linear motion and the tension in the springs together with the cams are used to maintain baskets or trays of food in the desired position until the operator moves the handle again.

13 Claims, 8 Drawing Sheets

DEEP FAT FRYER LIFTING ASSEMBLY

FIELD OF THE INVENTION

This invention relates to deep fat fryers and in particular to a mechanical lifting assembly for commercial deep fat fryers to permit an operator to raise and lower a basket rack containing food in the fryer.

BACKGROUND OF THE INVENTION

A commercial deep fat fryer typically has a tank which holds melted shortening or oil and heat tubes extending through the lower portion of the tank which heat the oil to the cooking temperature. When the oil is at a proper temperature an operator must lower the food into the tank until it is cooked and then retrieve it. Foods typically cooked in a commercial situation with a deep fat fryer include battered coated chicken, fish and non-battered coated items such a french fries. In a commercial situation it is desirable to cook large quantities of such foods, but the problem of lowering the food into the tank, and retrieving the cooked food from the tank should require only a minimum involvement of an operator. Most importantly, great physical exertion from the operator should not be required as the size and stature of such individuals will very widely from commercial establishment to establishment.

Certain commercial deep fat fryers are intended to be pressure cookers also and therefore, a heavy lid is provided. Typically the baskets of food are suspended from the lid. In such a situation as described in U.S. Pat. Nos. 5,402,712; 6,009,795; and 6,322,831 due to the weight involved, a motorized assembly is used to raise and lower the lid and depending baskets of food. The presence of a motorized assembly will involve maintenance, and the possibility of breakdowns. In the above patents, the motors are disposed in the rear part of the fryer assembly which would normally be adjacent a wall and a flue for the heat tubes. In a typical fast food establishment space is at a premium, and the back of the fryer would normally be disposed abutting a wall. Maintenance of a motor then could be difficult and time consuming. However, if the lid is very heavy, there may be no choice but the use of a motorized assembly.

In other commercial deep fat fryers the fryer itself is not a pressure cooker and the tank remains open to the atmosphere. In such fryers typically the food is disposed in baskets or on a stack of mutually spaced trays which when lowered into the fryer will occupy substantially the cooking area available. Even though a heavy lid is not involved, raising and lowering such a quantity of food could require considerable physical strength without a mechanical assist.

There is a need then for a reliable mechanical assist for raising and lowering food containing trays from a deep fat fryer which requires only average physical strength and can be operated by virtually any kitchen employee in a commercial fast food establishment.

U.S. Pat. No. 4,930,408 describes a mechanical assist wherein although a lid is utilized, the lid with a tray carriage suspended from the lower surface is mounted on a pair of arms which are secured to a vertically moveable carriage mounted at the rear of the cooker. The vertically moveable carriage is connected by cables and pulleys to a counter balancing weight which counter balances the weight of the lid. The combination of pulleys and cables is described as providing a three to one mechanical advantage. Therefore, even though when the lid is physically lowered the counter balancing weights must be raised, there is a three to one mechanical advantage to achieve the same. It is further described that two cables are provided, one active and one passive as a back up in case of failure of the active cable and/or its pulley system. This patent, however, does not describe the structure which would be optimal in the case of a mechanical lifting assembly which did not involve a heavy lid.

SUMMARY OF THE INVENTION

It has been discovered that a dependable lift assembly with a mechanical assist can be provided for deep fat fryers wherein ordinary physical strength only is required, and a basket or tray can be maintained in the raised position or in the lowered position without regard for the weight of the food therein. In other words the basket or trays would be maintained in a raised position even though it is loaded with food or in a lowered position even if it is empty. Furthermore, the mechanical assist lift assembly of this invention does not involve cables and pulleys with counter weights.

The lift assembly of this invention is designed to translate rotary motion into linear vertical motion whereby raising or lowering a lifter arm causes rotary motion about a fixed arm support coupling. The lifter arm is U-shaped with opposing ends being rotatably coupled to a support. A long axle is disposed between the rotatable couplings so that rotational movement of the handle and coupling will result in rotational movement of the long axle. A short axle is fixed above and below the long axle.

Cam members are fixed to the long axle, and extend outwardly therefrom with arms disposed in a common plane perpendicular to the axis of the long axle. Springs are attached at the ends of the cam members with one spring affixed to the upper short axle, and the opposite spring affixed to the lower short axle. Upper and lower stops are also provided for the rotational movement of the cam members.

In operation then when the basket is lowered, the springs will be placed in tension to counter act the weight of the food on the carrier and when the carrier is raised the tension will be relieved. Furthermore, spring tension and the cam action design will keep the basket in a lowered position; by equalizing the tension, at a midpoint position, or in the upper position against a stop.

Accordingly, it is an object of this invention to provide a mechanical lift assembly for a deep fat fryer to assist an operator in raising and lowering food relative to the cooking tank.

It is another object of this invention to provide a mechanical assist which uses a cam and spring action to translate rotational motion into linear motion.

It is another object of this invention to provide a cam actuated mechanical assist assembly which will maintain a food carrier in a raised position, in a midpoint position, or in a lowered position by the action of raising and lowering a lifter assembly handle.

It is further object of this invention to provide a mechanical lift assembly which utilizes springs mounted on a cam mechanism mounted on a rotatable axle to use spring tension to assist in raising and lowering a food carrier assembly.

It is yet another object of this invention to provide a spring actuated cam mechanism in combination with a rotatable stop for a lifter assembly wherein when the assembly is lowered the springs will be placed in tension and at the lowest point the cam mechanism will lock the springs in maximum tension whereby when the assembly is raised at a midpoint the springs will be in balanced tension, and at the upper point the springs will still be in tension, against a rotational stop to counter act the force of gravity on the lifter assembly.

These and other objects will become readily apparent with reference to the drawings and following description wherein.

BRIEF DESCRIPTION OF THE DRAWINGS

FIG. 6a is a front perspective view of the lifter carriage assembly of this invention.

FIG. 6b is a rear perspective view of the carriage assembly of FIG. 6a.

DETAILED DESCRIPTION OF THE INVENTION

Figure 1:
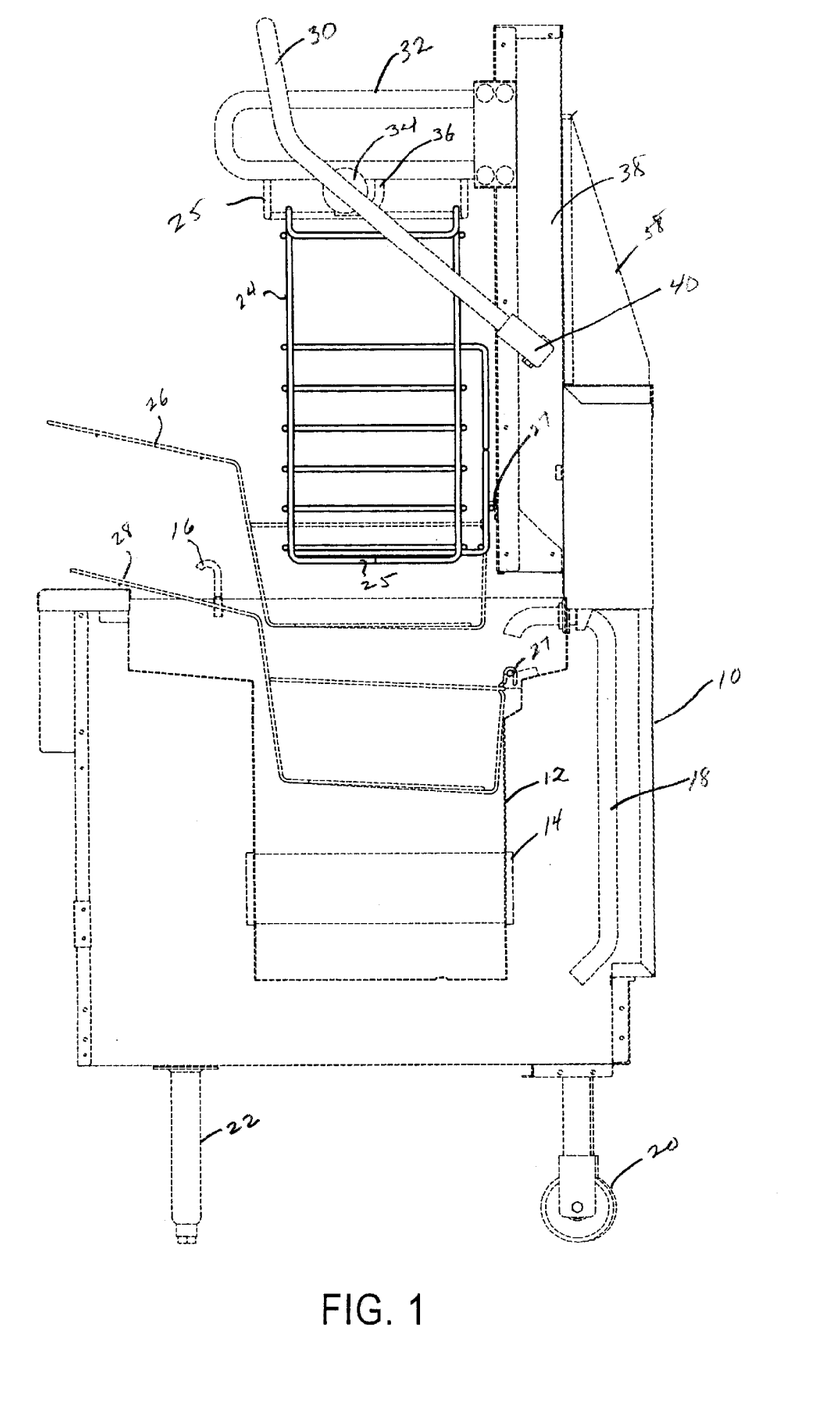
FIG. 1 is a side view of a typical deep fat fryer with the lifter assembly of this invention mounted thereon in the up position.
Figure 2:
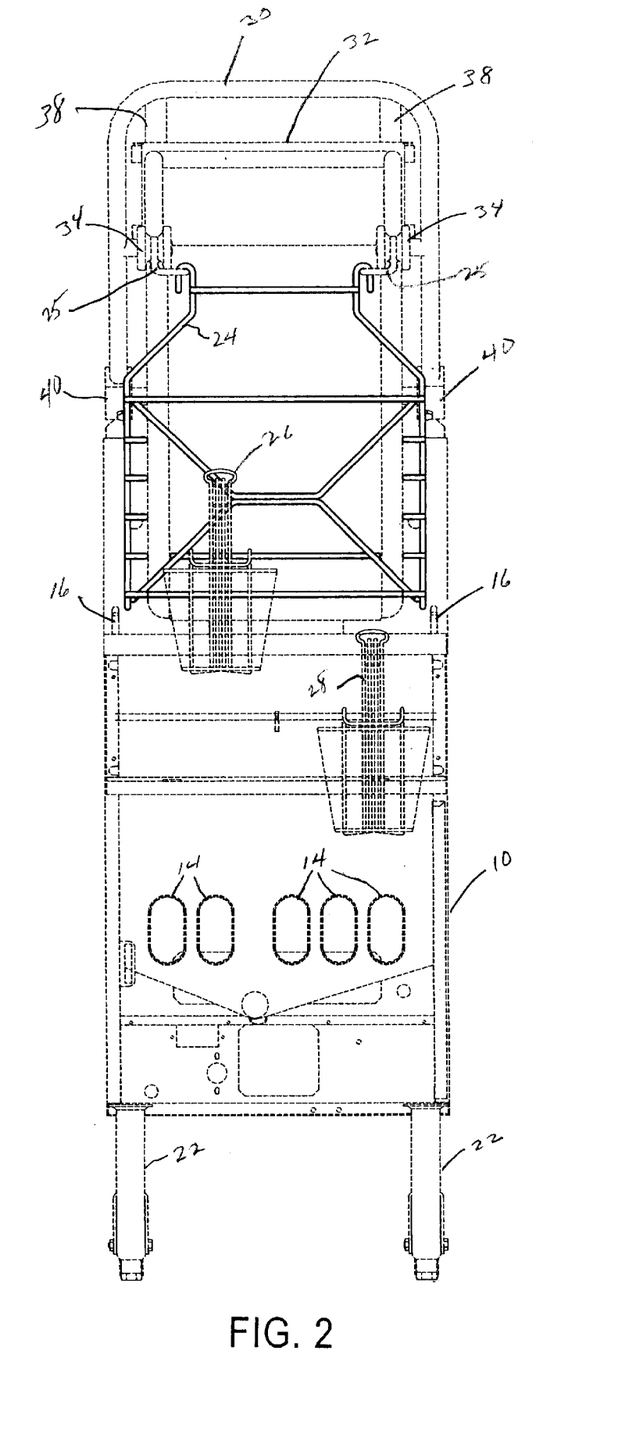
FIG. 2 is a front view of a deep fat fryer with the lifter mechanism of this invention.

With attention to FIGS. 1 and 2, a typical deep fat fryer 10 has an internal tank 12 heated by heat tubes 14 which extend from the front to the back of the tank and during cooking are submerged in the cooking media to heat the same. Tray support hooks 16 may be provided on which to support a tray (not shown) when the cooked food is being unloaded. An oil supply tube 18 can be provided and typically the unit is mounted on at least a pair of caters 20 and legs 22.

FIGS. 1 and 2 show a rack 24 suspending baskets 26 and 28, basket 26 is in the drain or storage position and basket 28 is in the cooking position. A hook 27 is provided to stabilize the baskets 26 and 28. The baskets would be filled with food (not shown) such as french fries. The lifting mechanism of this invention includes a lifter handle 30 and a horizontal carriage 32, lifter roller bearings 34 are mounted on the lifter handle 30 and ride on the underside of the carriage. A stop 36 is provided on the underside of carriage 32 to engage the roller 34 when the lifter arm is in the up position so that, as will be subsequently explained the lifter arm will cease rotation about a vertical track 38. The lifter arm 30 is substantially U-shaped. Lifter arm 30 two couplings 40 coupling the arm 30 to the long axle 64 (FIG. 8).

With attention to FIGS. 6a, 6b, 6c, and 6d, the lift carriage assembly 32 has suspended on either side support members 44 for mounting the rack 24 as shown in FIGS. 1 and 2. The carriage 32 includes a roller mount 46 having four pairs of opposed roller bearings 48. Two sets of bearings 48 are disposed in either side of the mount 46. The pairs of bearings 48 are intended to capture the track member 38 as shown, for example, in FIGS. 3a, 4a, and 5a.

Figure 8:
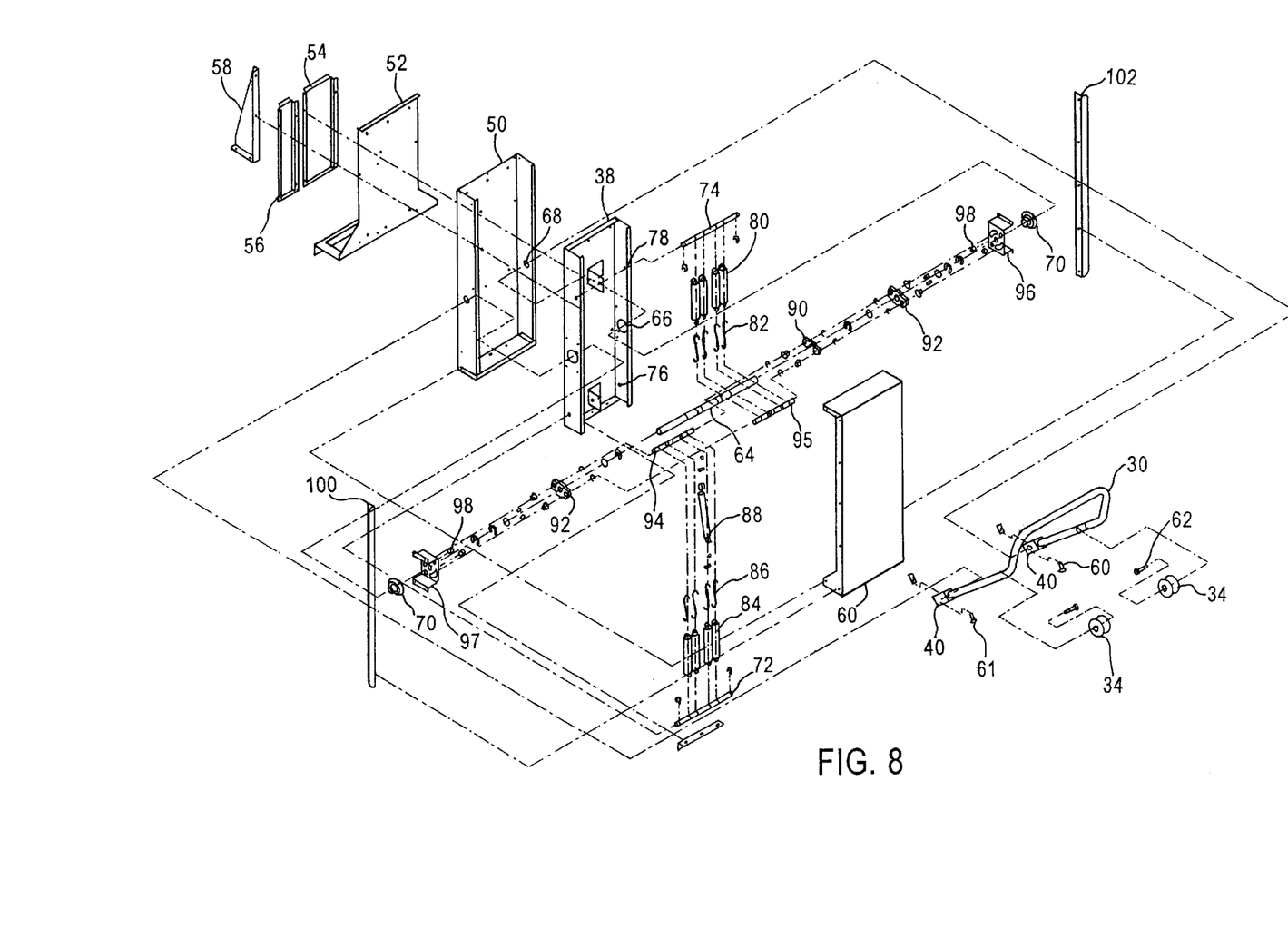
FIG. 8 is an exploded view of the assembly of this invention without the lift carriage.

With attention to FIG. 8, the track 38 includes a housing 50, mounting plate 52, right and left heat shields 54 and 56 and support gusset 58. A cover 60 is also provided. The handle 30 has rotatable couplings 40 mounted by pins 61 and similarly rollers 34 are also mounted by pins 62 to the handle 30. A long axle 64 extends through holes 66 in track 38 and holes 68 in housing 50. An axle bearing 70 is provided at either end of long axle 64 and bearings 70 are mounted in holes 66. Upper and lower short axles 72 and 74 are mounted in holes 76 and 78 in track 38.

Four springs 80 are mounted on upper axle 74 and are coupled with S-links 82 to the long axle 64. Similarly, springs 84 are mounted on lower axle 72 and are coupled to the long axle 64 with S-links 86. An optional hydraulic damper 88 may be connected by bracket 90 between large axle 64 and lower axle 72. Cam members 92 are centrally mounted at either side of long axle 64. Axles 94 and 95 interconnect the cam members 92 and the S-links 86 and S-links 82 and 86 engage axles 94 and 95. Cam members 92 are rigidly affixed to the long axle 64. The ends of axles 94 and 95 extend through axle stops 96 and 97 and are secured by rubber stoppers 98. The optional damper mounted bracket 90, and cam members 92 are secured to main axle 64 by a variety of conventional keys pins, bushings, snap rings and the like. Guide rails 100 and 102 are secured on either side of housing 60 for engaging carriage 32.

Figure 3A:
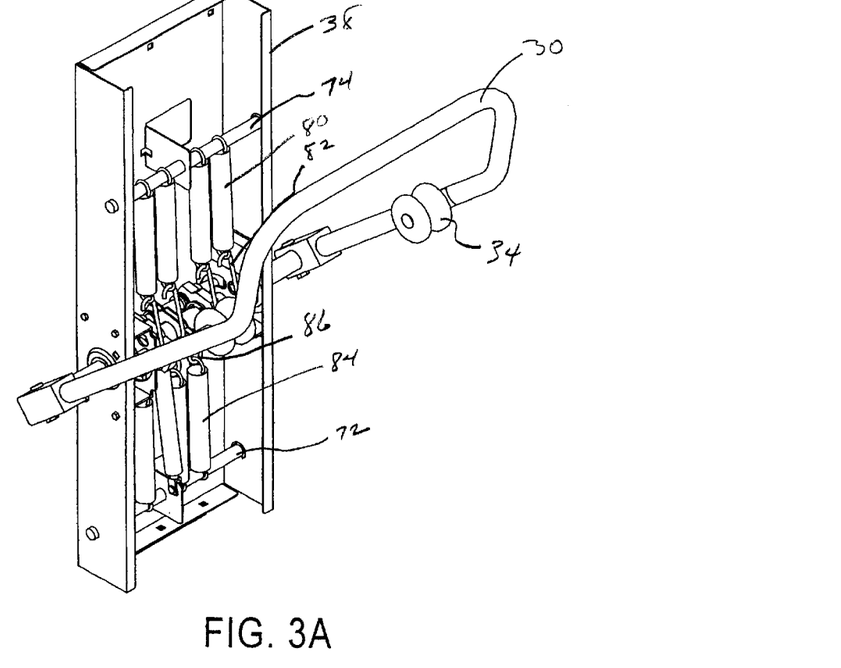
FIG. 3a is a fragmentary view of the lifter assembly of this invention shown in perspective.
Figure 3B:
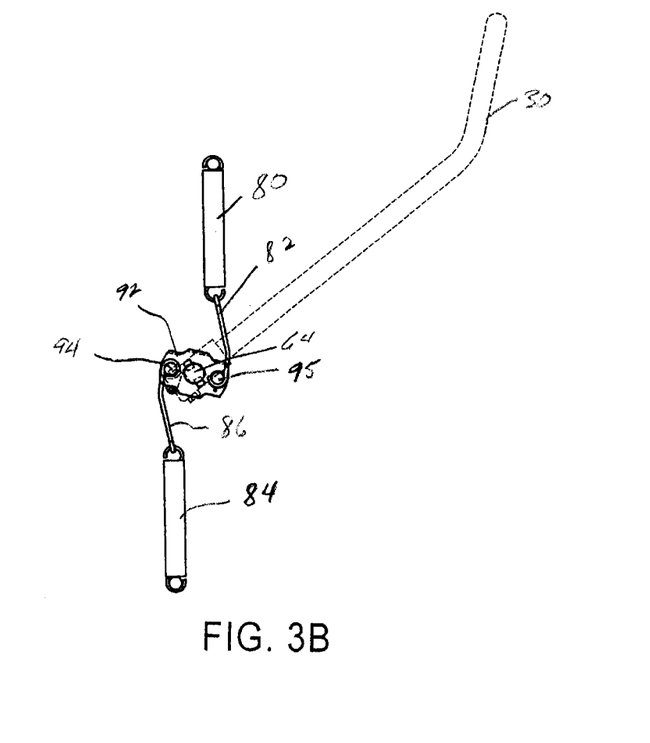
FIG. 3b is a fragmentary view showing the tension spring cam mechanism for the lifter of this invention in the up position.
Figure 4A:
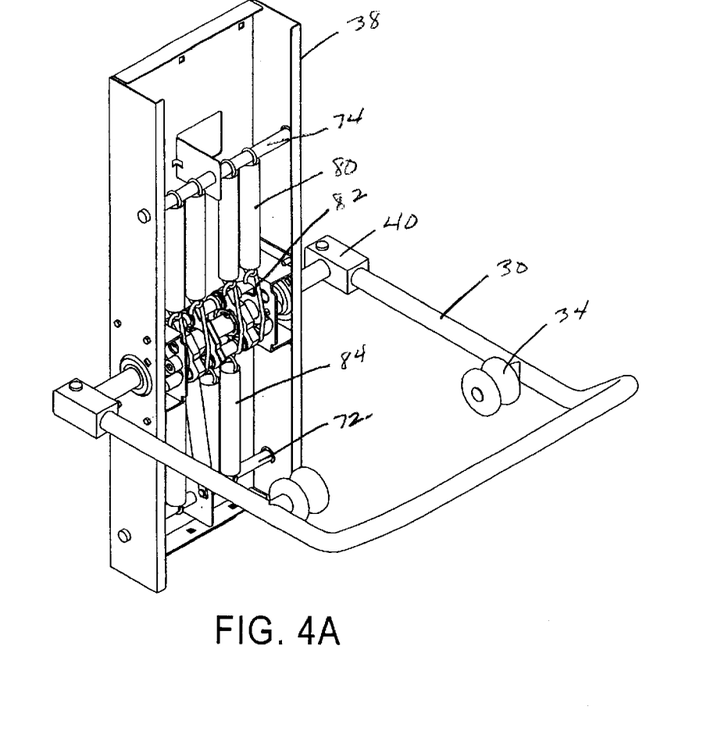
FIG. 4a is a fragmentary view of the lifter assembly of this invention in the midway position.
Figure 4B:
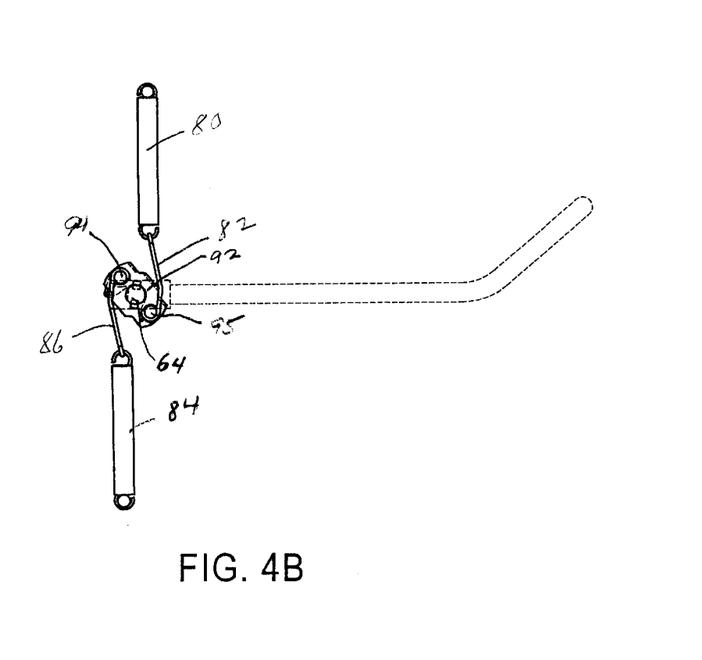
FIG. 4b is a view of the cam spring tension mechanism for the lifter assembly of this invention in the midway position.

With attention to FIGS. 3a and 3b, the lift mechanism of this invention is shown therein and with the handle in the raised position whereby the rack 24 suspended from hangers 25 will be in the position shown in FIGS. 1 and 2. The rollers 34 mounted on handle 30 will be engaged by handle stops 36 to keep the springs 82 and 84 in tension whereby the basket will be maintained in the raised position.

Figure 5A:
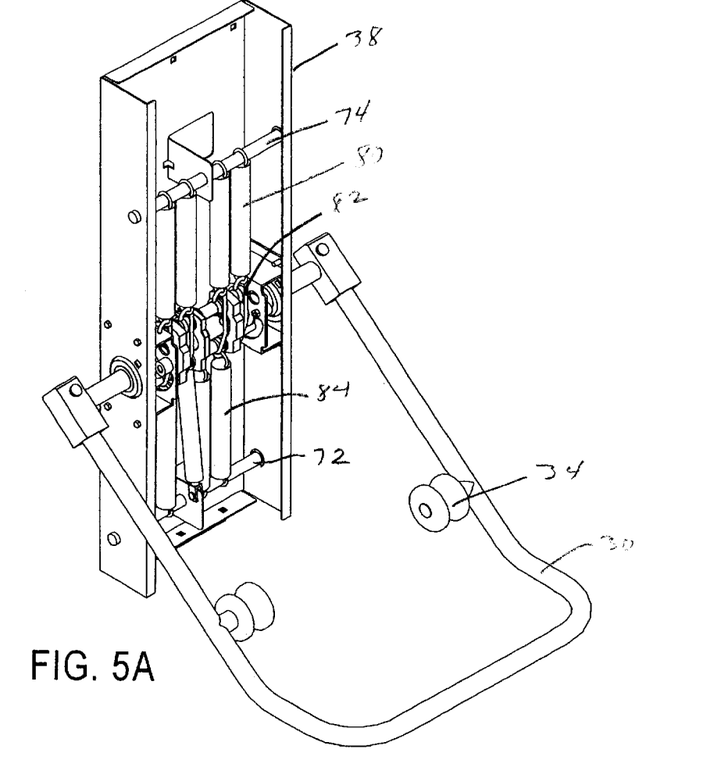
FIG. 5a is a fragmentary view in perspective of the lifter mechanism in the down position.
Figure 5B:
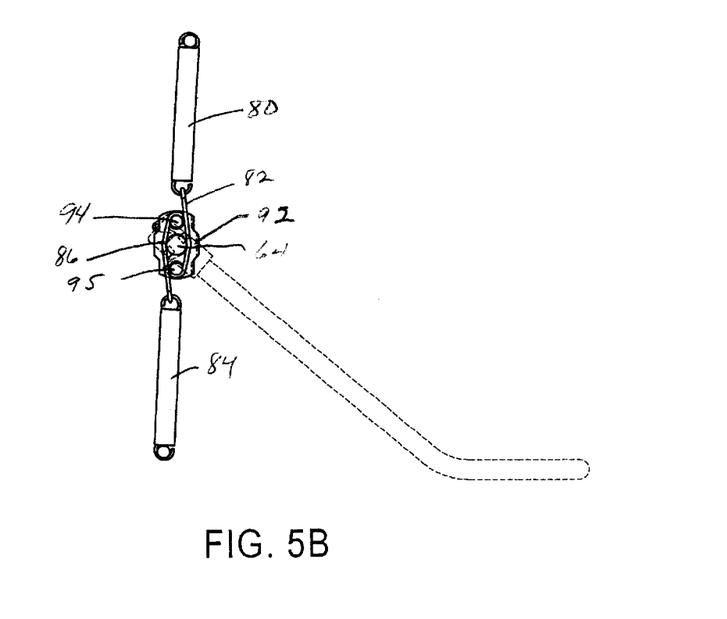
FIG. 5b is a fragmentary view showing the spring tension cam mechanism for the lifter assembly of this invention in the down position.
Figures 6A, 6B:
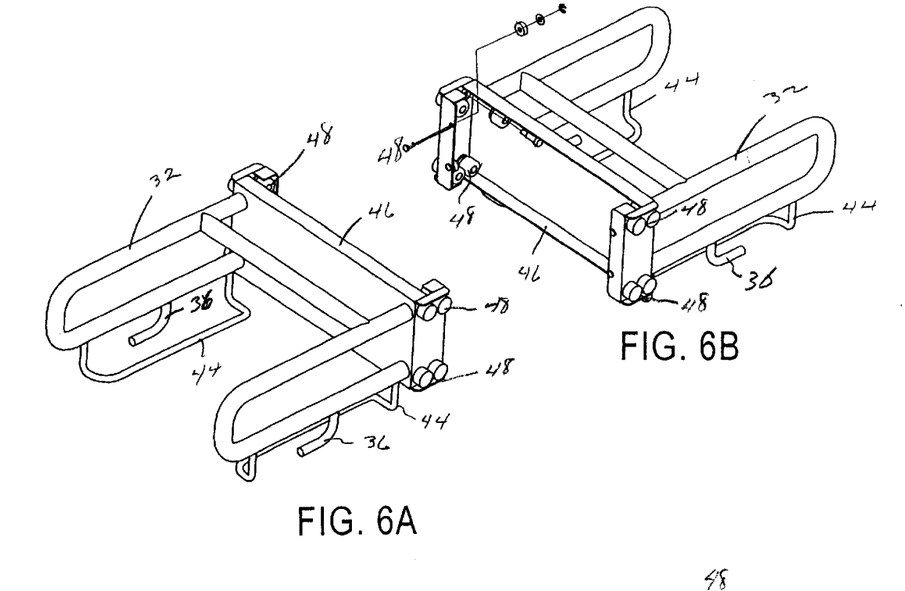
Figure 6C:
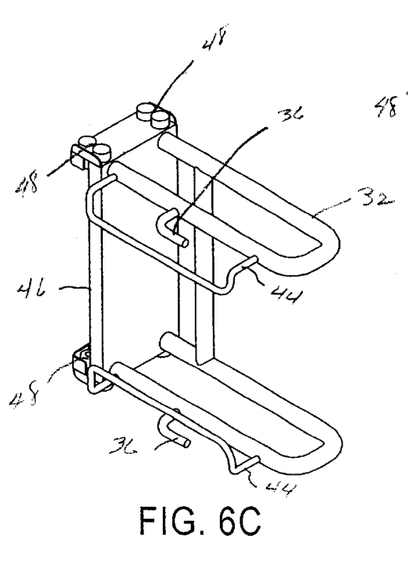
FIG. 6c is a perspective view of the carriage of FIG. 6a rotated 90°.
Figure 6D:
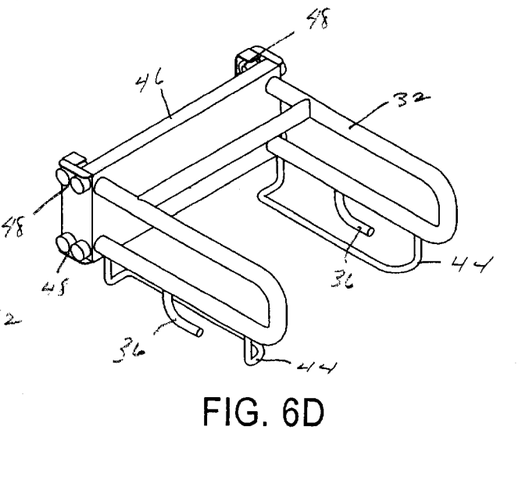
FIG. 6d is a left side perspective view of the carriage assembly of this invention.

With reference to FIGS. 5a and 5b, when the handle 30 is lowered to the lowest position and the rack 24 would be submerged in cooking oil in the tank 12 the cam member will be vertical so that the tension in springs 80 and 84 will not act on the axle 92 but rather will act against each other whereby the rack 24 will be maintained in the lower position until the handle is raised.

By using springs and cam members then raising and lowering the rack from the cooking oil can be mechanically assisted whereby the operator guides the handle to the desired position.

Figure 7:
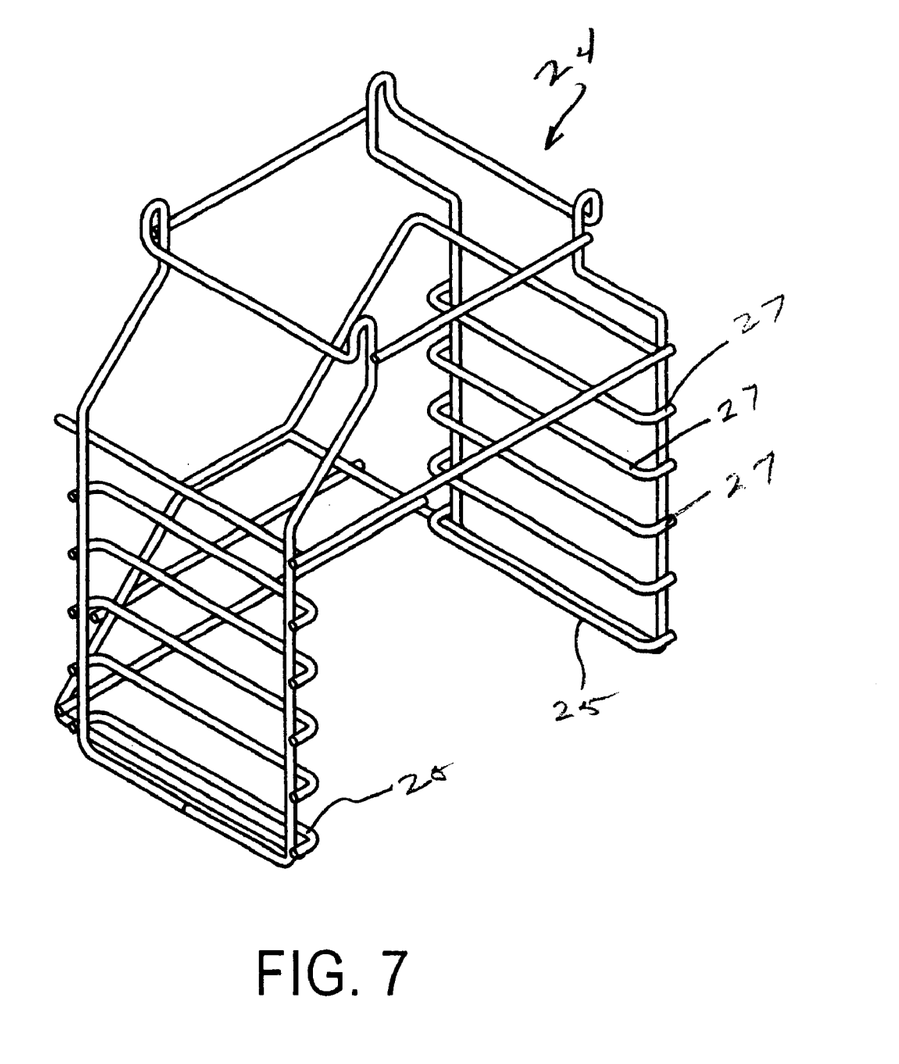
FIG. 7 is a perspective view of the wire rack carrier for the assembly of this invention.

With reference to FIG. 7, there is shown therein a multipurpose rack of this invention. The rack includes hanger members 25 for hanging baskets of food as shown in FIGS. 1 and 2, and also a plurality of horizontal stacked support members 27 for supporting individual trays (not shown).

The trays can contain, for example, battered coated chicken parts and are desirable with foods which would stick together if cooked in a basket. The rack 24 then can function either to mount baskets or trays or both.

In summary, the mechanical assist lifter mechanism of this invention utilizes are plurality of opposed springs on axles with cam members so that the spring tension provides the mechanical assistance to raising and lowering the food to be cooked. An operator merely raises and lowers a handle which converts rotary motion into linear vertical motion by the use of cams and assisting springs.

It will be readily seen by one of ordinary skill in the art that the present invention fulfills all of the objects set forth above. After reading the foregoing specification, one of ordinary skill will be able to effect various changes, substitutions or equivalents and various other aspects of the invention as broadly disclosed herein. It is therefore intended that the protection granted hereon be limited only by the definition contained in the appended claims and equivalents thereof.

What is claimed is:

1. In a deep fat fryer having an upwardly opening tank for containing cooking media and food to be cooked disposed in at least one food container, the improvement comprising:

a mechanical lift assist coupled to said tank and supporting said at least one food container including vertical track means mounted on said tank and extending above the open top thereof;

lift carriage means vertically movably coupled to said track means for supporting said at least one food container suspended therefrom; and mechanical lift means coupled between said track means and carriage means for raising and lowering said carriage means and maintaining said carriage means selectively in a lowered position, or a raised position by translating rotary movement of at least one member thereof into linear movement of said carriage means.

2. The device of claim 1 wherein said track means includes a vertically disposed track and a U-shaped in cross section housing mounting said track.

3. The device of claim 2 wherein said lift carriage means includes a horizontally extending carriage; opposed roller bearings mounted at one end thereof, said bearings engaging said track.

4. The device of claim 3 wherein said lift means includes a U-shaped handle having ends rotatably coupled to said track housing and roller means thereon engaging said carriage and supporting the same whereby rotation and said handle relative to said housing will raise or lower said carriage in said track.

5. The device of claim 4 wherein said maintaining means includes a long axle extending through said housing and fixed to the ends of said handle, cam means mounted on said long axle and opposed spring tension means coupled between said housing and said cam means for mechanically assisting rotation of said handle relative to said housing.

6. The device of claim 5 wherein said cam means includes at least two aligned members spaced apart and centrally mounted on said axle each member having a pair of arms extending outwardly from said long axle perpendicularly to the longitudinal axis thereof said pair of arms being disposed 180° from each other and a pair of short axle members interconnecting aligned arms on said members.

7. The device of claim 4 further comprising opposed rollers on said handle and stop means on said carriage for engaging said rollers when said carriage is in the raised position against further upward movement.

8. The device of claim 6 wherein said spring tension means includes a first set of springs interconnecting one of said short axles and said housing and a second set of spring interconnecting said other short axle and said housing said first set connected to said housing above said long axle and said second set connected to said housing below said long axle.

9. The device of claim 8 wherein said springs are in tension with the tension force changing as the long axle rotates.

10. The device of claim 3 wherein the carriage means includes an open rack suspended from said carriage, said rack having lower hooks for mounting at least one basket and shelf supports for mounting trays.

11. The device of claim 9 further comprising opposed rollers on said handle and stop means on said carriage for engaging said rollers when said carriage is in the raised position against further upward movement, said handle being urged against said stop means by said springs.

12. The device of claim 9 wherein said carriage is in the midway position the tension on said first and second sets of springs is balanced and said cam members are horizontal.

13. The device of claim 9 wherein when said carriage is in the lower position said cam members are vertical.

* * * * *